June 30, 1970     T. T. BROWN     3,518,462
FLUID FLOW CONTROL SYSTEM
Filed Aug. 21, 1967     2 Sheets-Sheet 1
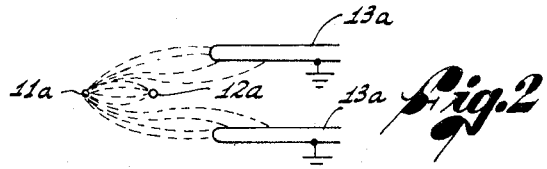
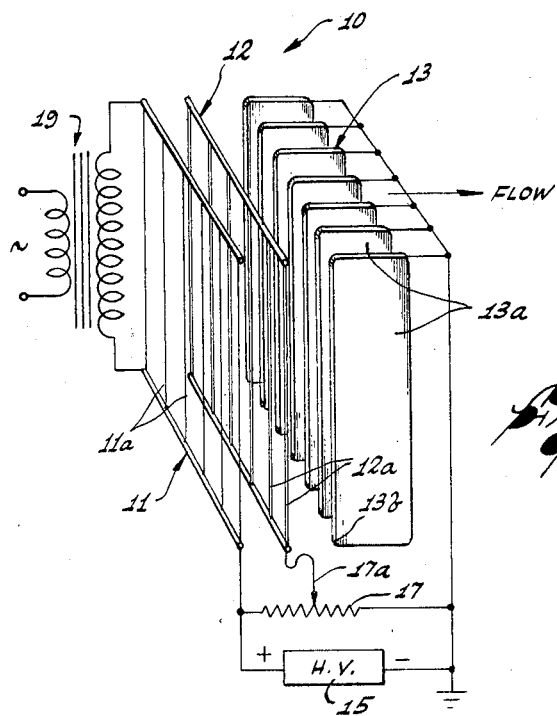
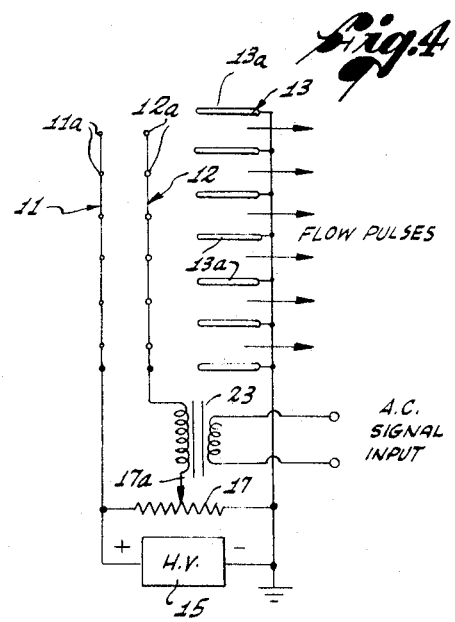
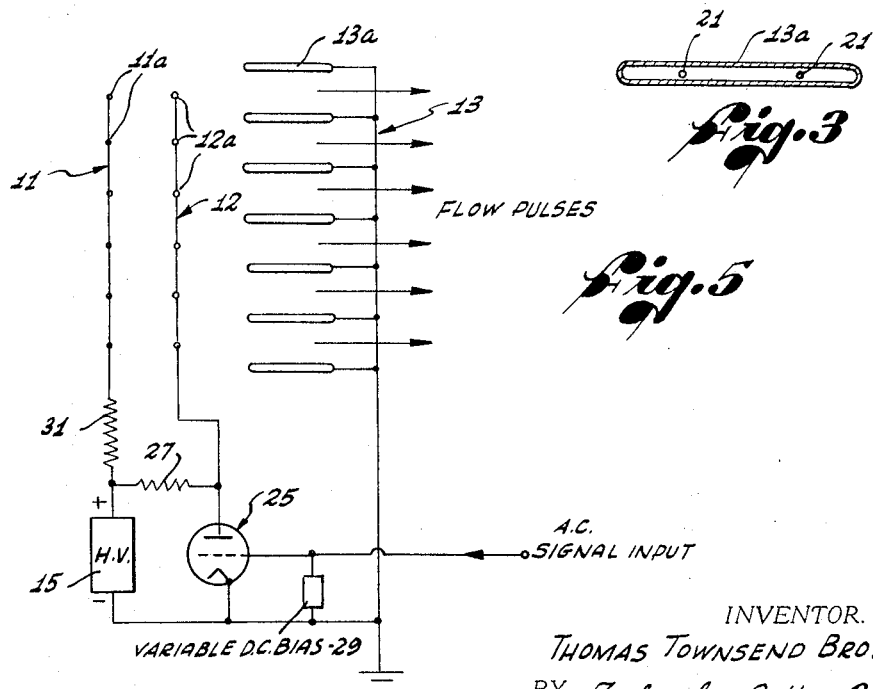
INVENTOR.
THOMAS TOWNSEND BROWN
BY Fulwider, Patton, Rieber, Lee, and Utecht
ATTORNEY INVENTOR.
THOMAS TOWNSEND BROWN
BY Fulwider, Patton, Rieber
Lee, and Utecht
ATTORNEYS United States Patent Office 3,518,462
Patented June 30, 1970

3,518,462
FLUID FLOW CONTROL SYSTEM
Thomas Townsend Brown, Santa Monica, Calif., assignor, by mesne assignments, to Guidance Technology, Inc.
Filed Aug. 21, 1967, Ser. No. 662,105
Int. Cl. H02n 4/20
U.S. Cl. 310—10
13 Claims

ABSTRACT OF THE DISCLOSURE

Apparatus for producing fluid flow and for selectively varying the flow rate and pressure of an ionizable, dielectric fluid medium. Three spaced apart electrodes are supported in the fluid medium with a high D.C. voltage impressed across the two outermost electrodes, the D.C. voltage being of sufficient magnitude to produce ionization adjacent one electrode of the outermost pair but being below the voltage level at which arcing between any of the electrodes would occur. The D.C. electrical potential of the third electrode located intermediate the outermost electrode pair is varied to alter the shape of the electrostatic field between the electrodes and thereby vary the quiescent fluid flow rate. A relatively low level A.C. electrical signal may also be applied to the third electrode to modulate the fluid flow and pressure whereby a combined signal amplifier and electro-acoustic transducer is provided.

BACKGROUND OF THE INVENTION

This invention relates generally to improvements in fluid flow control systems and, more particularly, to a new and improved flow control system wherein a relatively low level electrical signal input controls or modulates the output pressure and flow rate of an ionizable dielectric fluid medium. The invention finds particular application as a fluid pump and as a combined signal power amplifier and loudspeaker.

It has been heretofore proposed that electrohydrodynamic phenomena and electrophoresis be harnessed to convert electrical energy directly into fluid flow without the aid of moving parts. Typical examples of structural arrangements suitable for this purpose are disclosed in the present applicant's prior U.S. Pats. Nos. 2,949,550 and 3,018,394. Both of these patents teach electrokinetic apparatus wherein a pair of oppositely charged electrodes of appropriate form are maintained in specified spatial relationship and are immersed in a dielectric fluid medium to generate a force which moves the dielectric medium with respect to the pair of electrodes. Hence, the apparatus functions as a noiseless fan or pump utilizing no moving parts.

In applicant's U.S. Pat. No. 3,018,394, the electrical current flow between the pair of electrodes is electrically modulated to generate pressure waves in the dielectric fluid medium so that the system can perform as an electro-acoustic transducer or loadspeaker. In this regard, a relatively high level A.C. signal is superimposed upon the D.C. high voltage bias across the electrode pair to produce pressure pulses in the form of compressions and rarefactions in the fluid medium and thereby generate sound waves. The resultant device may operate either as a loadspeaker or, conversely, as a microphone.

Unfortunately, while the aforedescribed electrokinetic systems have generally served their purposes, those applications calling for electrical modulation or control of fluid flow rate have encountered difficulties in that the entire D.C. supply current between the electrode pair must be modulated by the control signal. This requires a relatively large amount of control signal energy which, in turn, usually entails the need for expensive power amplifiers.

Hence, those concerned with the development and use of electrokinetic apparatus of the aforedescribed type have long recognized the need for improved electrokinetic apparatus whereby the fluid flow rate and pressure of an ionizable dielectric fluid medium can be more efficiently, economically and reliably controlled over a relatively wide range. The present invention fulfills this need.

SUMMARY OF THE INVENTION

Briefly, and in general terms, the present invention provides an electrofluid-dynamic triode wherein a three-electrode array of prescribed size, shape, spatial relationship and electrical potentials, is used to produce fluid flow and selectively vary flow rate and pressure in an ionizable, dielectric fluid medium.

Use of the term "dielectric fluid medium" with reference to the present invention is deemed to include any and all suitable dielectric liquids, dielectric gases, and mobile dielectric solids suspended in an appropriate fluid vehicle.

The electrofluid-dynamic triode includes first and second spaced apart electrodes immersed in the dielectric fluid medium. A third electrode, also immersed in the fluid medium, is physically located in the space between the first and second electrodes and is spaced apart from both of these latter electrodes. The second and third electrodes have a greater surface area than the first electrode, and the second electrode preferably has a greater surface area than the third electrode. A relatively high D.C. voltage is impressed across the first and second electrodes, the magnitude of the impressed voltage being equal to or greater than the ionization threshold for the first electrode, but less than the voltage level at which arcing would occur between any of the three electrode, whereby relative flow between the dielectric fluid medium and the three-electrode structure is produced.

The third electrode is a control electrode, and means are provided for varying the electrical potential of the third electrode to vary the rate of flow and pressure of the fluid medium. In this regard, the D.C. potential of the third electrode may be varied to control quiescent or steady state fluid flow rate or the A.C. potential may be varied by modulation to cause no net change in flow rate but to generate pressure waves. If desired, both A.C. and D.C. potentials may be varied to simultaneously control flow rate and generate pressure waves. Relatively small variations in control electrode potential yield relatively large variations in output flow and pressure. Hence, the invention is capable of being utilized as a fluid pump, as well a a combined signal amplifier and output pressure transducer.

In presently preferred embodiments, by way of example and not by way of limitation, additional preamplification of the A.C. modulation signal may be provided, the basic three-electrode configuration may be provided in push-pull versions involving no net fluid flow, the electrodes may be heated and/or coated with various materials to improve emissivity, and the electrodes may be fabricated of materials which permit higher operating voltages while simultaneously minimizing the likelihood of arcing between the electrodes.

BRIEF DESCRIPTION OF THE DRAWINGS

The above and other objects and advantages of the invention will become apparent from the following more detailed description, when taken in conjunction with the accompanying drawings of illustrative embodiments thereof, and wherein:

FIG. 1 is a combined electrical schematic diagram and perspective view of an electrofluid-dynamic triode in accordance with the present invention and adapted to selectively vary quiescent flow rate of a dielectric fluid medium;

FIG. 2 is an enlarged, partial plan view of the electrode array of FIG. 1, illustrating a typical electrostatic field pattern established by the electrodes;

FIG. 3 is an enlarged, sectional view of one of the electrodes of a typical electrofluid-dynamic triode, and further illustrates the manner in which such an electrode may be heated to improve emissivity;

FIG. 4 is a combined electrical schematic diagram and plan view of another embodiment of an electrofluid-dynamic triode capable of selectively variable fluid flow and also capable of A.C. modulation to function as a combined amplifier and electro-acoustic transducer;

FIG. 5 is a combined electrical schematic diagram and plan view of a further embodiment of an electrofluid-dynamic triode which utilizes a single stage of preamplification for the A.C. signal input to the control electrode;

DESCRIPTION OF THE PREFERRED EMBODIMENTS

Figure 6:
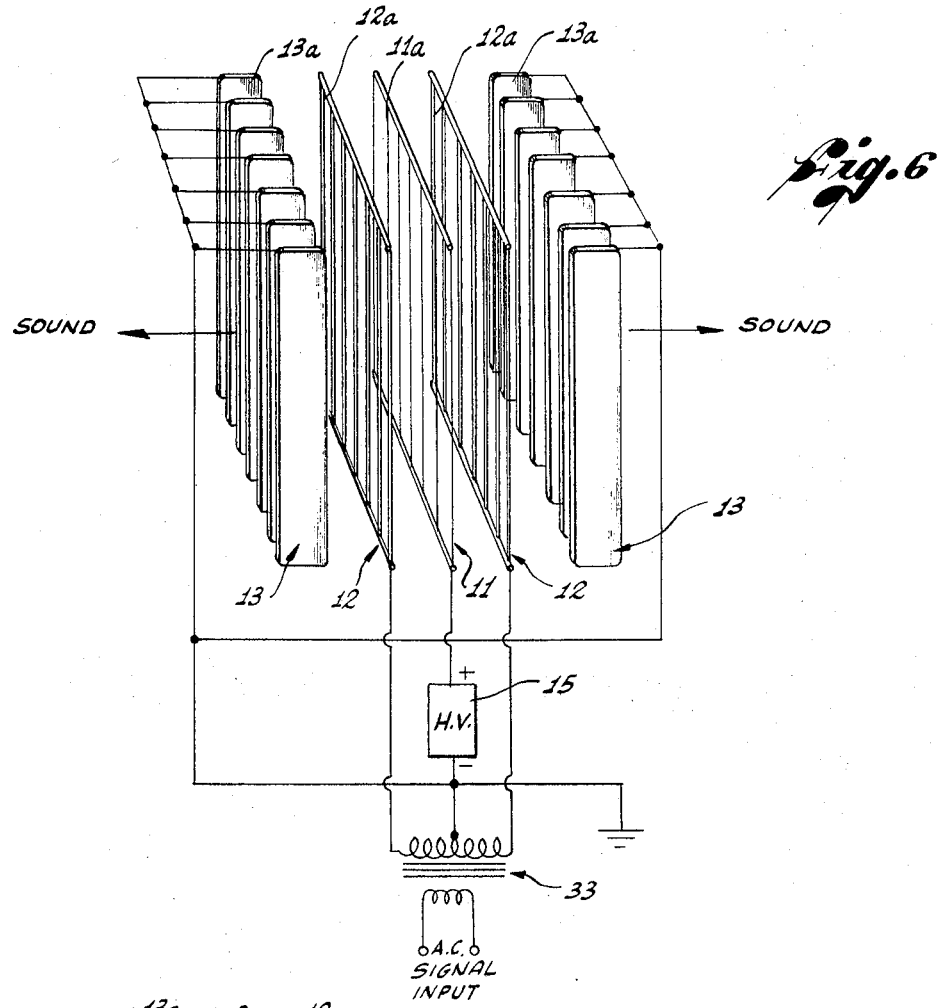
FIG. 6 is a combined electrical schematic diagram and perspective view of a push-pull control arrangement adapted to provide combined signal amplification and electro-acoustic transducer output, in accordance with the invention.

Referring now to the drawings, wherein like reference numerals designate like or corresponding parts throughout the several figures, there is shown in FIG. 1 an electrofluid-dynamic triode 10 comprising an array of three spaced apart electrodes 11, 12 and 13.

A D.C. power supply 15 provides a source of high voltage which is connected across the outer pair of electrodes 11 and 13. A high resistance potentiometer 17 is connected in parallel with the power supply 15, the potentiometer including a conventional slider 17a which is electrically connected to the electrode 12 located between the outer pair of electrodes 11 and 13. The electrode 12 is the control electrode for the three-electrode array, and the D.C. electrical potential of this electrode is selectively varied by moving the slider 17a of the potentiometer 17.

The three-electrode electrofluid-dynamic triode 10 is immersed in any desired ionizable, dielectric fluid medium, such as air, oil or the like, and the application of high D.C. voltage across the electrodes 11 and 13 imparts flow to the fluid medium, the flow rate being varied by varying the electrostatic potential of the control electrode 12.

The high D.C. voltage impressed across the electrodes 11 and 13 by the power supply 15 typically falls in the range of 7.5 kilovolts–25 kilovolts with electrical with electrical current demands proportional to the size of the system, typical current requirements being from approximately 1 ma. for small systems to several hundred ma. for large systems.

The magnitude of the voltage impressed across the electrodes 11 and 13 must be equal to or greater than the ionization threshold for the electrode 11, but less than the voltage level at which arcing would occur between any of the electrodes 11, 12 and 13.

The application of the required D.C. voltage across the electrodes 11 and 13 establishes a divergent electrostatic field, with the field diverging from the electrode 11 towards the electrode 13. The electrostatic potential of the control electrode 12 conrols the shape of electrostatic field and the emission of ions from the electrode 11 which, in the embodiment of FIG. 1, is shown to be connected to the positive side of the power supply 15 and, hence, functions as an anode electrode. The transfer of momentum from ions emitted at the electrode 11 to the host fluid medium, typically air, and the electrostrictive gasdynamic effect upon the dielectric fluid medium cause the fluid to move in the direction of divergence of the electrostatic field, i.e., towards the electrode 13 which functions as a cathode electrode.

Depending upon the system requirements, either the positive or negative side of the power supply 15 may be grounded, or the entire power supply may be floating with respect to the ground. The ground connection in no way affects the rate of flow or degree of flow control.

While the specific electrical polarity configuration shown in FIG. 1 is not critical, it is a preferred arrangement. The electrical polarity may be reversed without changing the direction of fluid flow. While the volume of fluid flow with reversed polarity is approximately the same, reverse polarity may result in side effects which are usually considered undesirable. In this regard, when the electrode 11 is at a negative potential, a "beaded" type of corona, as opposed to a smoothly luminous positive corona, surrounds the electrode 11. The "beaded" corona comprises regions of excessively high localized field gradients which may result in the generation of ozone and a hissing sound.

In the electrode system of FIG. 1, where it is of primary importance to create a divergent electrostatic field, the electrode shape and field geometry are extremely important since operating efficiency depends primarily on the degree of field divergence. In this regard, the electrode 11 must be provided with a relatively small surface area, to encourge ionization adjacent the electrode, while the electrode 13 should preferably have a surface area several orders of magnitude greater than the surface area of the electrode 11. Moreover, the surface area of the control electrode 12 must be less than the surface area of the electrode 13 and is preferably greater than the surface area of the electrode 11.

The electrode 11 may comprise either a single fine wire electrode element or a grid of fine wire electrode elements 11a. Each electrode element 11a is typically less than 0.003 in. in diameter and may be fabricated of any electrically conductive material and preferably of a material which is also strong mechanically and resistant to corrosion. Typical of such materials are stainless steel, tungsten and the like.

The electrode 13 typically comprises a plurality of electrode elements 13a provided as a parallel array of plates fabricated of electrically conductive or partially-conductive material. While metallic plates are generally satisfactory for the electrode elements 13a, these electrode elements may also be fabricated of a material having a relatively high electrical resistivity, e.g., carbon powder suspended in a suitable plastic, so that very high voltages can be utilized in the system without causing arcing between the electrodes. In this connection, when the electrode elements 13a have a high resistivity, the possibility of damaging spark discharge to the edges of these electrode elements is minimized, since the low conductivity prevents localization of an intense electric field which must precede such spark discharge.

It will also be noted that the leading edges of the electrode elements 13a are provided with a substantial radius to eliminate sharp edges facing the highly charged control electrode 12. It has been empirically determined that this results in reduced sparking, less noise, and improved flow, as well as enhanced quality of electroacoustic output.

It will be appreciated that the array of electrode plate elements 13a for the electrode 13 in FIG. 1 is preferred, but not critical. In this connection, a wire screen may be substituted for the elements 13a as long as the screen surface area is substantially greater than the surface area provided by the electrodes 11 and 12.

The control electrode 12 is in the form of a wire grid or screen comprising a plurality of single wire electrode elements 12a. The diameter of the wire forming each of the electrode elements 12a is preferably greater than the diameter of the wire forming each of the electrode elements 11a.

When the high D.C. voltage from the power supply 15 is impressed across the electrodes 11 and 13, each of the electrode elements 11a is surrounded by a coronal envelope which is smooth, silent and slightly luminous. The dielectric fluid in the region of the coronal envelope is intensely ionized, generating both positive and negative ions. The negative ions are pulled into the positive anode electrode 11 and are neutralized, whereas the positive ions are repelled by the positive charge on the electrode 11 and travel in the general direction of the cathode electrode elements 13a.

The arrangement and spacing of the electrode elements 11a, 12a and 13a is such as to provide a divergent electrostatic field from the electrode elements 11a outward towards the electrode elements 13a. In this regard, the shape of the electrostatic field pattern is illustrated in FIG. 2 and is typical for the case where the control electrode 12 is negative relative to the anode electrode 11. FIG. 2 also illustrates an electrode arrangement wherein each of the electrode elements 11a and 12a are preferably located in a plane which is centrally disposed between a pair of cathode electrode plate elements 13a.

For a power supply voltage of approximately 15 kilovolts, and with air as the dielectric fluid medium, the electrodes 11 and 13 are typically spaced apart approximately 1.5 in. and the control electrode 12 is preferably centrally located between the electrodes 12 and 13, i.e., approximately 0.75 in. from both electrodes 12 and 13.

Positive ions falling through the electrostatic field established between the electrodes 11 and 13 transfer their momentum to the host fluid medium in passing through the field. The fluid medium is then driven through the electrode array, in the direction moving from the electrode 11 towards the electrode 13, by ion momentum transfer. The drift or ions through the host fluid medium under the influence of electric field may also involve some degree of electrophoresis. Concurrently, electrostrictive gasdynamic forces are created in the divergent electrostatic field which tend to drive the entire volume of dielectric fluid in the space between the electrodes in the direction of divergence of the electrostatic field.

Gasdynamic pressure is initiated in the coronal envelope by corona pressure and extends outward in the direction of the divergent electrostatic field. This gasdynamic pressure is constant when the field is constant. However, when the field varies, the gasdynamic pressure is also varied simultaneously. In this connection, any variation in the electrical potential of the control electrode 12 causes a change in the shape of the electrostatic field created between the electrodes 11 and 13, so as to alter the corona pressure at the electrode 11 and the further augmentation of the corona pressure produced by electrostriction. In this regard, electrostrictive gasdynamic pressure, i.e., molecular squeezing action caused by a divergent electric field, varies instantaneously with the applied electric field, whereas pressure resulting from ion momentum transfer is relatively slow in building up due to the finite time of flight of slow moving positive ions.

The efficiency of fluid flow also depends on the emissivity of the electrodes, i.e., the anodes for the emission of positive ions and the cathodes for the emission of electrons and the establishment of a negative space charge. To this end, the emissivity of the electrodes may be increased by coating the electrodes with such materials as cesium, barium chloride, thorium oxide, various radioactive materials and the like.

Emissivity may also be improved by heating the electrodes. By way of example, the electrode 11 is illustrated in FIG. 1 as being connected across the secondary winding of a stepdown transformer 19 which heats each of the fine wire electrode elements 11a. The transformer 19 simultaneously isolates the A.C. power source from the high voltage D.C. potential applied to the electrode 11.

FIG. 3 illustrates an alternative heating arrangement wherein a plurality of resistance heating elements are supported within each electrode plate element 13a. The heating elements 21 are connected to a suitable external electrical power source (not shown).

Referring now again to FIG. 1, when the slider 17a of the potentiometer 17 is moved in one direction or the other, the electrical potential of the control electrode 12 is changed with a corresponding change in the rate of flow of the dielectric fluid medium through the electrode array.

When the control electrode 12 is at the same electrical potential at the anode electrode 11, the field around the electrode 11 is virtually eliminated, the corona around the latter electrode is extinguished, ions are no longer generated, and the flow of dielectric fluid is minimized. When the electrical potential of the control electrode 12 is the same as the cathode electrode 13, the fluid flow rate is at a maximum.

Referring now more particularly to FIG. 4 of the drawings, there is shown an electrofluid-dynamic triode wherein an A.C. signal is superimpose don the D.C. potential applied to the control electrode 12. With this exception, the embodiment of the control system shown in FIG. 4 essentially duplicates that shown in FIG. 1 and like reference numerals denote like or corresponding parts in the embodiments of FIGS. 1 and 4.

In FIG. 4, the secondary winding of a signal transformer 23 is included in series with the control electrode 12 and the potentiometer slider 17a. A relatively low level A.C. signal input to the primary winding of the transformer 23 thus modulates the electrostatic potential of the electrode 12 above and below the quiescent D.C. potential established by the position of the slider 17a. In this regard, the fluid flow rate, or level of fan action, is determined essentially only by the position of the slider 17a. The A.C. modulation generates pressure waves in the dielectric fluid medium with essentially no variation in net flow rate.

It is presently believed that this generation of pressure waves by A.C. modulation results primarily from electrostrictive gasdynamic pressure pulses rather than ion momentum transfer.

FIG. 5 illustrates an electrofluid-dynamic triode control system similar to the embodiment of FIG. 4 and including a single stage of preamplification for an A.C. signal input. This preamplification is provided by a triode 25. However, while amplification is illustrated in the embodiment of FIG. 5 as being accomplished by the triode 25, it will be apparent that other active electron amplifying devices, such as transistors and the like, may be substituted for the vacuum tube amplifier without in any way departing from the spirit and scope of the present invention.

The triode 25 has its cathode-anode circuit electrically connected in series between the electrode 12 and the negative side of the D.C. power supply 15. A conventional plate load resistor 27 is connected between the plate of the triode 25 and the positive side of the power supply 15. The A.C. signal input to the system is applied in any appropriate manner to the grid of the triode 25.

A variable D.C. bias source 29 is connected between the grid and cathode of the triode 25. The source 29 establishes the quiescent D.C. current flow through the triode 25 and, hence, the potential drop across the plate resistor 27. This also establishes the D.C. potential of the electrode 12, and, consequently, establishes the rate of flow of the dielectric fluid medium through the electrode array.

The overall system of FIG. 5 provides two stages of amplification, the first stage of amplification being provided by the triode 25, and the second stage of amplification for the A.C. signal input being provided by the electrofluid-dynamic triode itself. Hence, a relatively low level A.C. signal input to the grid of the triode 25 results in the generation of relatively high level pressure pulses in the electro-acoustic output from the system.

A current limiting resistor 31 is included in series between the positive side of the power supply 15 and the anode electrode 11 to prevent any spark breakdown in the space between the electrodes 11 and 12 during excessive voltage peaks.

Referring now to FIG. 6 of the drawings, there is shown an electro-acoustic transducer, in accordance with the invention, which essentially utilizes a pair of electrofluid-dynamic triodes in a symmetrical push-pull arrangement analogous to the conventional push-pull circuit configuration for electronic amplifiers.

In the arrangement of FIG. 6, a single common anode electrode 11 is utilized for the dual electrofluid-dynamic triode arrangement. The anode electrode 11 is connected to the positive side of the high voltage power supply 15.

A pair of control electrodes 12 are disposed on opposite sides of the electrode 11 and are electrically connected to opposite ends of the secondary winding of an input high voltage transformer 33. The secondary winding of the transformer 33 is center tapped and connected to the negative terminal of the power supply 15.

The outer pair of cathode electrodes 13 of the push-pull arrangement are also connected to the negative side of the power supply 15. From a practical standpoint, it is also desirable to use the outer cathode electrodes 13 as protective grids at the sides of an appropriate enclosure (not shown) and, hence, the electrodes 13 and the negative side of the power supply 15 are preferably grounded to protect the ultimate user against high voltage shock.

Since the electrode arrangement of FIG. 6 is electrically balanced, and the entire structure is in an enclosed housing (not shown) which admits a dielectric fluid medium, such as air, only through the electrodes 13, there is no net fluid flow through the system. In this regard, sound waves are generated by the electrical action upon the air column between the electrodes, first in one direction and then in the other, to provide push-pull operation which generates compressions and rarefactions alternately on each side of the electrode structure.

An A.C. signal input to the primary winding of the transformer 33 is stepped up by the secondary winding to produce relatively high opposing potentials (180° out of phase) between the pair of control electrodes 12 on opposite sides of the common anode electrode 11, so that pressure pulses are directed first one way, and then the other way, to cause a push-pull generation of sound waves in the air column.

Figure 7:
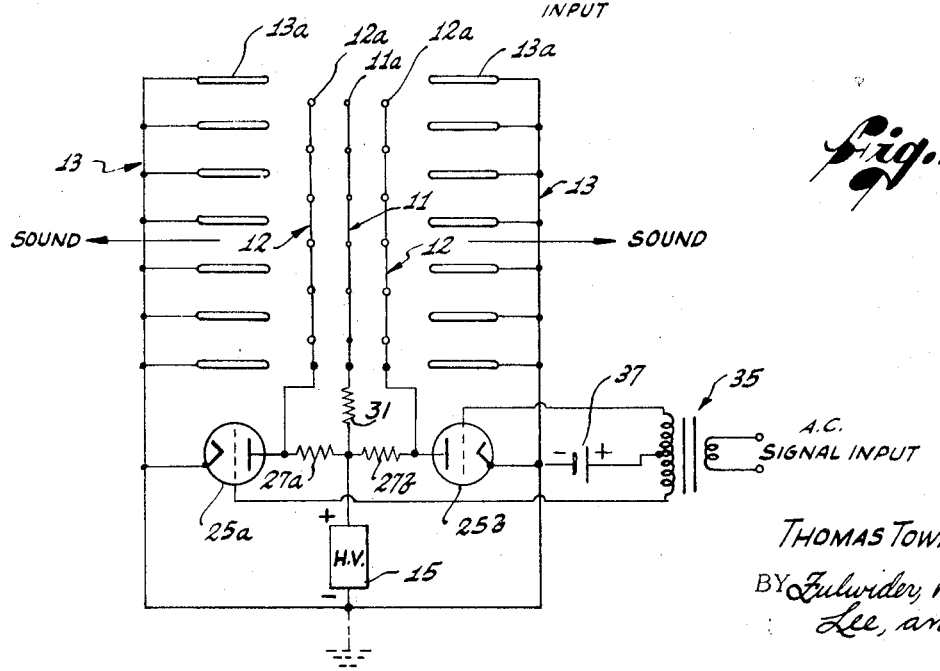
FIG. 7 is a combined electrical schematic diagram and plan view of another embodiment of an electro-acoustic push-pull transducer utilizing preamplification for the control signal.

Referring now to FIG. 7 of the drawings, there is shown another embodiment of a push-pull electro-acoustic transducer in accordance with the invention. The embodiment of FIG. 7 differs from the embodiment of FIG. 6 primarily in the use of vacuum tube preamplification, as opposed to the use of the high voltage transformer 33.

In practice, the embodiment of FIG. 7 may be preferred over the arrangement of FIG. 6 because of improved fidelity. In this regard, the high voltage transformer 33 may produce greater distortion and impose more severe frequency limitations, due to relatively high inter-winding capacitance and the like.

The common anode electrode 11 in FIG. 7 is electrically connected to the positive side of the power supply 15 through a series current limiting resistor 31 which performs the same function as the resistor 31 in the embodiment of FIG. 5.

A pair of vacuum tube triodes 25a and 25b, together with their plate resistors 27a and 27b, respectively, perform the same functions as the single triode 25 and its associated plate resistor 27 in the embodiment of FIG. 5, except that the triodes 25a and 25b are connected in a push-pull amplifying configuration. To this end, the cathodes of both triodes 25a and 25b are connected to the negative side of the power supply 15 (preferably grounded), and the plates of the triodes are each tied to a different one of the control electrodes 12 while also being connected through their respective plate resistors 27a and 27b to the common high voltage positive side of the power supply 15.

The grids of both triodes 25a and 25b are connected to opposite ends of the center tapped secondary of a low level signal input transformer 35.

An appropriate grid bias source 37 is connected between the cathodes of the triodes 25a and 25b and the center tap of the secondary winding for transformer 25, providing D.C. bias for the triodes to their proper quiescent operating points. It will be apparent, of course, that other electronic preamplifying configurations, such as those using solid state devices, may be substituted for the vacuum tube push-pull amplifier shown in FIG. 7 without departing from the scope of the invention.

The electro-acoustic output provided by the electrofluid-dynamic triodes in the embodiments of FIGS. 4, 5, 6 and 7 are characterized by extremely wide frequency response, free from resonant peaks and mechanical distortion. In this connection, the electrofluid-dynamic triode portion of the transducer system, exclusive of electronic signal input and pre-amplification devices which may impose frequency limitations of their own, is capable of essentially uniform frequency response from below 10 Hz. to well in excess of 100 kHz. since, as opposed to conventional loudspeaker arrangements, there is no speaker diaphragm mass to be moved. Only the molecules and ions of the dielectric fluid medium are oscillated.

Moreover, the electro-acoustic transducers provided by the present invention not only provide excellent transducer action, but simultaneously and inherently provide a stage of signal amplification independent of any additional preamplification that may be provided. Hence, in some instances, expensive power amplification may not be needed, and the relatively low level A.C. signal input may prove sufficient to provide the desired level of electro-acoustic output.

The present invention satisfies a long existing need for new and improved electrokinetic apparatus capable of more efficiently, economically and reliably controlling fluid flow rate and pressure in an ionizable, dielectric fluid medium. Hence, the present invention provides an improved, more versatile fluid pump, and a new and improved electro-acoustic transducer which also provides inherent power amplification for a relatively low level signal input.

It will be apparent from the foregoing that, while particular forms of the invention have been illustrated and described, various modifications can be made without departing from the spirit and scope of the invention. Accordingly, it is not intended that the invention be limited, except as by the appended claims.

1. A fluid flow control system, comprising:
   a first electrode adapted to be immersed in an ionizable, dielectric fluid medium;
   a second electrode spaced apart from said first electrode an also adapted to be immersed in said fluid medium, said second electrode having a greater surface area than said first electrode;
   a third electrode spaced apart from said first and said second electrodes and physically located between said first and said second electrodes, said third electrode also adapted to be immersed in said fluid medium and said third electrode having a greater surface area than said first electrode but less surface area than said second electrode;
   a source of D.C. voltage electrically connected across said first and said second electrodes, said voltage being of a magnitude greater than the ionization threshold for said first electrode but less than the voltage at which arcing occurs between any of said electrodes; and
   means for varying the electrical potential of said third electrode including means for modulating said electrical potential with an A.C. voltage to generate pressure waves in said fluid medium.

2. A fluid flow control system, comprising:
a first electrode adapted to be immersed in an ionizable, dielectric fluid medium;
a second electrode spaced apart from said first electrode and also adapted to be immersed in said fluid medium, said second electrode having a greater surface area than said first electrode;
a third electrode spaced apart from said first and said second electrodes and physically located between said first and said second electrodes, said third electrodes also adapted to be immersed in said fluid medium, and said third electrode having a greater surface area than said first electrode but less surface area than said second electrode;
a source of D.C. voltage electrically connected across said first and said second electrodes, said voltage being of a magnitude greater than the ionization threshold for said first electrode but less than the voltage at which arcing occurs between any of said electrodes; and
means for varying the electrical potential of said third electrode comprising first means for varying the D.C. electrical potential and second means for modulating the electrical potential with an A.C. voltage.

3. A fluid flow control system, comprising:
a first electrode adapted to be immersed in an ionizable, dielectric fluid medium;
a second electrode spaced apart from said first electrode and also adapted to be immersed in said fluid medium, said second electrode having a greater surface area than said first electrode;
a third electrode spaced apart from said first and said second electrodes and physically located between said first and said second electrodes, said third electrodes also adapted to be immersed in said fluid medium, and said third electrode having a greater surface area than said first electrode but less surface area than said second electrode;
a source of D.C. voltage electrically connected across said first and said second electrodes, said voltage being of a magnitude greater than the ionization threshold for said first electrode but less than the voltage at which arcing occurs between any of said electrodes; and
means for varying the electrical potential of said third electrode;
said third electrode being of electrically resistive material to minimize inter-electrode arcing.

4. A fluid flow control system, comprising:
a first electrode adapted to be immersed in an ionizable, dielectric fluid medium;
a second electrode spaced apart from said first electrode and also adapted to be immersed in said first medium, said second electrode having a greater surface area than said first electrode;
a third electrode spaced apart from said first and said second electrodes and physically located between said first and said second electrodes, said third electrode also adapted to be immersed in said fluid medium, and said third electrode having a greater surface area than said first electrode but less surface area than said second electrode;
a source of D.C. voltage electrically connected across said first and said second electrodes, said voltage being of a magnitude greater than the ionization threshold for said first electrode but less than the voltage at which arcing occurs between any of said electrodes; and
means for varying the electrical potential of said third electrode including A.C. amplification means connected in series with said third electrode.

5. A fluid flow control system, comprising:
a first electrode adapted to be immersed in an ionizable, dielectric fluid medium;
a second electrode spaced apart from said first electrode and also adapted to be immersed in said fluid medium, said second electrode having a greater surface area than said first electrode;
a third electrode spaced apart from said first and said second electrodes and physically located between said first and said second electrodes, said third electrodes also adapted to be immersed in said fluid medium, and said third electrode having a greater surface area than said first electrode but less surface area than said second electrode;
a source of D.C. voltage electrically connected across said second electrodes, said voltage being of a magnitude greater than the ionization threshold for said first electrode but less than the voltage at which arcing occurs between any of said electrodes; and
means for varying the electrical potential of said third electrode;
said first and said third electrodes each comprising a plurality of parallel wires and said second electrode comprises a plurality of parallel plates;
each of said parallel wires of said first and said third electrodes lying in planes passing substantially midway between adjacent pairs of said parallel plates of said second electrode.

6. A system for imparting movement to an ionizable, dielectric fluid medium comprising:
a first electrode adapted to be immersed in said fluid medium;
a second electrode spaced apart from said first electrode and also adapted to be immersed in said fluid medium;
a third electrode spaced apart from said first and said second electrodes and located between said first and said second electrodes, said third electrode also adapted to be immersed in said fluid medium;
a source of D.C. voltage electrically connected to said electrodes such that the potential of said third electrode with respect to said first electrode is maintained negative and the potential of said second electrode with respect to said third electrode is maintained negative, the voltage on said electrodes being of such relative magnitude as to cause ionization adjacent said first electrode without arcing occurring between any of said electrodes, the potential relationship between all said electrodes determining the flow rate;
said ionization generating positive and negative ions, the negative ions being attracted by said first electrode and the positive ions being attracted away from said first electrode toward said third electrode resulting in movement of said medium.

7. A system as defined in claim 6 having control means for controlling the potential on said third electrode for producing a desired flow rate of said fluid medium.

8. A system as defined in claim 6 wherein said second and third electrodes have greater surface area than said first electrode.

9. A system as defined in claim 6 having a current limiting resistor in series with one of said electrodes.

10. A system as defined in claim 7 wherein said control means comprises means for modulating said electrical potential on said third electrode.

11. A system as defined in claim 6 wherein said second electrode has a greater surface area than said third electrode and said third electrode has a greater surface area than said first electrode.

12. A push-pull, electro-acoustic transducer, comprising:
a first electrode adapted to be immersed in an ionizable, dielectric fluid medium;
a pair of second electrodes also adapted to be immersed in said fluid medium and spaced apart from said first electrode on opposite sides thereof, each of said second electrodes having a substantially greater surface area than said first electrode;

a pair of third electrodes also adapted to be immersed in said fluid medium, one each of said third electrodes being located on opposite sides of said first electrode between said first and one of said second electrodes, each of said third electrodes having a greater surface area than said first electrode but less than the surface area of each of said second electrodes;

a source of D.C. voltage electrically connected across said first electrode and both of said second electrodes, said voltage having a magnitude greater than the ionization threshold for said first electrode but less than the voltage at which arcing occurs between any of said electrodes; and means for simultaneously varying the electrical potentials of both of said third electrodes.

13. A push-pull, electro-acoustic transducer as set forth in claim 12, wherein said means for simultaneously varying the electrical potentials of both of said third electrodes includes A.C. preamplification means connected between said third electrodes and an A.C. signal input.

References Cited

UNITED STATES PATENTS 3,018,394  1/1962  Brown ............ 310—5
3,374,941  3/1968  Okress .......... 103—1 X
3,411,025  11/1968  Marks ........... 310—11

DAVID X. SLINEY, Primary Examiner